United States Patent Office 2,818,431
Patented Dec. 31, 1957

2,818,431

PREPARATION OF 4-CYCLOHEXENEMETHYL-AMINE

Lindley Clair Beegle, Darien, Conn., assignor to American Cyanamid Company, New York, N. Y., a corporation of Maine No Drawing. Application November 2, 1955
Serial No. 544,603

10 Claims. (Cl. 260—563)

This invention relates to a novel process for preparing 4-cyclohexenemethylamine. More particularly, it relates to the selective hydrogenation of 4-cyanocyclohexane to form predominantly 4-cyclohexenemethylamine.

It is known that 4-cyanocyclohexene, obtained by the reaction of acrylonitrile and butadiene, can be converted under mild hydrogenation conditions to 4-cyclohexenemethylamine by treatment with metallic sodium in ethyl alcohol. This process does not satisfactorily lend itself to industrial application because metallic sodium must be handled. This constitutes a dangerous hazard in that extreme care must be exercised to avoid explosions. Although there is a marked demand for 4-cyclohexenemethylamine because it possesses good fungicidal properties, there has been no satisfactory process to meet this demand to the present.

It is a principal object of the present invention to present a new and novel process for hydrogenating 4-cyanocyclohexene. It is a further object of the invention to catalytically treat 4-cyanocyclohexene by selectively hydrogenating the same in the absence of sodium metal.

According to the present invention, the above objectives can be met by directly subjecting 4-cyanocyclohexene to drastic hydrogenation conditions whereby predominantly 4-cyclohexenemethylamine is obtained. The formation of the latter is indeed surprising because saturation of the cycloaliphatic ring to form substantially 4-cyclohexanemethylamine was expected. Advantageously, 4-cyanocyclohexene is selectively hydrogenated by means of hydrogen gas in the presence of catalytic amounts of either a nickel or cobalt catalyst. In order to complete the reaction within a reasonable time, an elevated hydrogen pressure is employed. For example, a good practice is to employ an impressed hydrogen gas pressure of from between about 750 p. s. i. and 4000 p. s. i. In this manner, the reaction may be completed within 1 to 8 hours.

It is desirable to use of from 1 part of catalyst to from about 10 to 50 parts of 4-cyanocyclohexene in the instant process. However, the amount of catalyst used herein is not critical.

It is an advantage of the present invention that elevated temperatures in the range of from about 90° C. to about 125° C. are sufficient to carry out the selective catalytic hydrogenation process. This latter process is conducted in any suitably closed vessel or autoclave. When the pressure remains substantially constant within the autoclave, conversion to 4-cyclohexenemethylamine has occurred. The autoclave is cooled to room temperature, vented and the contents therein filtered. Catalyst is separated and may be reused in subsequent hydrogenation operations without revivification. The filtrate may be fractionally distilled under reduced pressure so as to recover substantially pure 4-cyclohexenemethylamine. Alternatively, if desired, the filtrate may be subjected to chromatography to recover the latter amine.

In the foregoing description, it has been stated that any nickel or cobalt catalyst may be used. The catalyst may also be employed in conjunction with an inert carrier or support. For example, nickel supported on kieselguhr is well suited because the supported catalyst makes for easy filtration. Moreover, good yields of the 4-cyclohexenemethylamine compound are obtained when utilizing a nickel catalyst supported on kieselguhr. It is a further advantage that this catalyst permits the use of temperatures in the lower hydrogenation range of from about 95° C. to 100° C. In a similar manner, a cobalt catalyst such as Raney cobalt, is also particularly suitable. In the presence of these catalysts, continued hydrogenation does not substantially effect the ring unsaturated 4-cyclohexenemethylamine. However, small amounts of the corresponding cyclohexane derivative do form to the extent of less than about 30%. The following structural formulas are presented below to illustrate the overall selective hydrogenation reaction of the present invention in a graphic fashion:

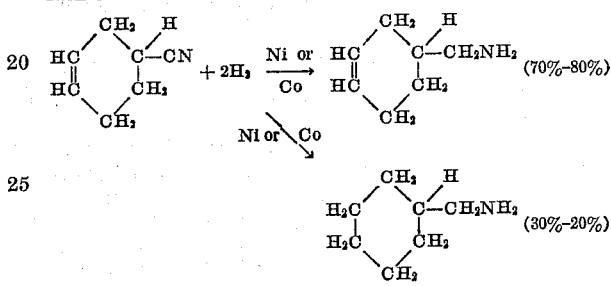

The above defined reaction may be carried out in the presence or absence of added anhydrous ammonia. However, the presence of anhydrous ammonia during the course of the catalytic hydrogenation is not critical. Should anhydrous ammonia be utilized, the tendency to form bis derivatives of cyclohexenemethylamine, for example, is reduced. Moreover, if ammonia is not added, the yield of desired primary amine will be reduced due to the formation of secondary amines. It is therefore an advantage and a preferred embodiment of the present process to utilize added anhydrous ammonia during the selective hydrogenation reaction.

The presented examples will serve to illustrate the preferred features of the process of the present invention. It is understood that they are not intended to limit the invention, but are merely illustrative thereof. Unless otherwise noted, the parts are by weight.

Example 1

600 parts of 4-cyanocyclohexene, 194 parts of anhydrous ammonia, and 50 parts of Harshaw nickel catalyst (nickel on kieselguhr) are placed in an autoclave and subjected to 1300–1400 p. s. i. hydrogen pressure at 95–100° C. Within about 4 hours, the pressure dropped to about 1250 p. s. i. and thereafter remained substantially constant, indicating that the reaction had been completed. It was observed that 2 mols of hydrogen for each mol of cyanocyclohexene derivative are absorbed. The reaction is cooled to room temperature and the autoclave is vented. The contents in the autoclave are then filtered to separate catalyst. Resultant filtrate is next subjected to fractional distillation under a reduced pressure of 29 mm. Hg. It is found that 4-cyclohexanemethylamine in about 20% yield is recovered at 68° C.–69° C. and at 29 mm. Hg pressure. 4-cyclohexenemethylamine in about 80% yield is recovered at 74° C–76° C. at the same pressure.

Example 2

Example 1 is repeated except that cobalt is substituted for the nickel catalyst. It is found that 4-cyclohexenemethylamine in about 77% yield is recovered and about 23% of 4-cyclohexanemethylamine is obtained,

Example 3

600 parts of 4-cyanocyclohexene is placed in an autoclave in the presence of Raney nickel catalyst (20 parts). The reactants are subjected to a hydrogen pressure of from 2000 to 3000 p. s. i., at a temperature of about 115° C. In about 6 hours, the reaction is complete. The autoclave is then cooled to room temperature, vented, and the contents therein filtered. The filtrate is subjected to fractional distillation at 30 mm. Hg pressure. 95% of the so-subjected filtrate is recovered at 68° C.–69° C. as a mixture of predominantly 4-cyclohexenemethylamine and a smaller amount of 4-cyclohexanemethylamine. Approximately, 5% does not distill. This residue essentially constitutes the corresponding bis derivative or secondary amine, such as bis-(4-cyclohexenemethylamine). Of the distilled mixture comprising 95% of the overall recoverable product, 4-cyclohexenemethylamine in 82% yield at 30 mm. Hg pressure and at 74° C.–76° C. An 18% yield of cyclohexanemethylamine is also recovered.

As previously stated, the 4-cyclohexenemethylamine finds utility as a fungicide. The following example will illustrate this activity.

Example 4

4-cyclohexenemethylamine, prepared as in Example 1, is dispersed in water to a concentration of 0.01%. The compound is then added to spores of Sclerotinia fructicola and Macrosporium sarcinaeforme, which are fungi parasitic on stone fruits and clover, respectively. Spores are cultured on potato dextrose agar slants. These were visible under low-power magnification. The spores are washed from the agar slants with distilled water and are adjusted to a concentration of approximately 50,000 spores per cc. of water.

To these spores are added the dispersed 4-cyclohexenemethylamine. It is noted that after a 20-hour period there is 100% kill of the organism. This indicates fungicidal activity of the 4-cyclohexenemethylamine compound.

I claim:

1. A method for the preparation of 4-cyclohexenemethylamine which comprises: hydrogenating 4-cyanocyclohexene in the presence of hydrogen gas and a hydrogenation catalyst selected from the group consisting of nickel and cobalt at elevated pressures of at least about 750 p. s. i. but not more than about 4000 p. s. i. and elevated temperatures of at least about 90° C. but not more than about 125° C., maintaining the hydrogen pressure until said pressure remains constant whereby selective conversion of said 4-cyanocyclohexene to predominantly 4-cyclohexenemethylamine is effected, and then recovering the latter amine.

2. A process according to claim 1 in which the catalyst is nickel.

3. The process according to claim 1 in which the catalyst is cobalt.

4. The process according to claim 1 in which the hydrogenation pressure ranges from about between 750 p. s. i. and 4000 p. s. i.

5. A process according to claim 1 in which catalytic hydrogenation is conducted in the presence of anhydrous ammonia.

6. A process according to claim 1 in which the 4-cyclohexenemethylamine is recovered by means of fractional distillation.

7. A process according to claim 6 in which the 4-cyclohexenemethylamine is recovered by fractional distillation under a reduced pressure of about 29–30 mm. Hg at about 74° C.–76° C.

8. A method for the preparation of 4-cyclohexenemethylamine from 4-cyanocyclohexene which comprises: adding 4-cyanocyclohexene and a small amount of a catalyst selected from the group consisting of nickel and cobalt to an autoclave, subjecting the contents therein to the action of impressed hydrogen gas at a temperature between 90° C. and 125° C., maintaining the pressure within said autoclave at between about 750 p. s. i. and 4000 p. s. i. at said temperature until the impressed hydrogen gas pressure remains a constant, cooling the autoclave, venting the latter to the atmosphere, filtering the contents in said cooled autoclave, recovering filtrate and fractionally distilling said filtrate to recover 4-cyclohexenemethylamine.

9. The process of claim 8 in which the hydrogenation step is conducted in the presence of anhydrous ammonia.

10. The process of claim 8 in which the catalyst is nickel supported on kieselguhr.

References Cited in the file of this patent

UNITED STATES PATENTS

| | | |
|---|---|---|
| 2,165,515 | Schmidt | July 11, 1938 |
| 2,166,971 | Schmidt et al. | July 25, 1939 |
| 2,449,036 | Grunfeld | Sept. 7, 1948 |
| 2,686,776 | Keim | Aug. 17, 1954 |
| 2,781,399 | Shapiro | Feb. 12, 1957 |

FOREIGN PATENTS

| | | |
|---|---|---|
| 477,050 | Germany | May 31, 1929 |